(12) United States Patent
Wada

(10) Patent No.: US 7,760,388 B2
(45) Date of Patent: Jul. 20, 2010

(54) AUTOMATIC PRINT FRAME SETTING APPARATUS

(75) Inventor: Tetsuya Wada, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 842 days.

(21) Appl. No.: 11/572,896

(22) PCT Filed: Jul. 30, 2004

(86) PCT No.: PCT/JP2004/010938

§ 371 (c)(1),
(2), (4) Date: Jan. 29, 2007

(87) PCT Pub. No.: WO2006/011230

PCT Pub. Date: Feb. 2, 2006

(65) Prior Publication Data
US 2008/0043255 A1 Feb. 21, 2008

(51) Int. Cl.
| | |
|---|---|
| G06K 15/00 | (2006.01) |
| G06K 9/20 | (2006.01) |
| G06K 9/36 | (2006.01) |
| H04N 1/393 | (2006.01) |
| H04N 1/387 | (2006.01) |
| H04N 1/46 | (2006.01) |
| G03F 3/10 | (2006.01) |

(52) U.S. Cl. ............... 358/1.18; 358/527; 358/538; 358/451; 358/453; 382/282; 382/286

(58) Field of Classification Search ............... 358/1.2, 358/1.18, 527, 538, 449, 451, 453; 382/282, 382/286, 291, 295, 298; 345/620, 628
See application file for complete search history.

(56) References Cited

U.S. PATENT DOCUMENTS 4,694,354 A 9/1987 Tanaka et al.

(Continued)

FOREIGN PATENT DOCUMENTS

DE 198 02 017 A1 7/1999

(Continued)

*Primary Examiner*—Twyler L Haskins
*Assistant Examiner*—Fred Guillermety
(74) *Attorney, Agent, or Firm*—Knobbe Martens Olson & Bear LLP

(57) ABSTRACT

The present invention relates to an automatic print frame setting apparatus, comprising:
 image displaying means 3 for displaying, on a monitor screen, image data used for producing photo prints;
 size setting means 6 for setting one or more types of print sizes for the same image data;
 print frame displaying means 7 for displaying, on the monitor screen, a print frame visually representing the set print size together with the image data; and
 print image data producing means 10 for producing, based on the set print frame, print image data used for producing photo prints,
 wherein the print frame displaying means 7 includes automatic print frame producing means 9 that simultaneously displays, on the monitor screen, only two print frames, which are a first print frame whose aspect ratio is nearest to a square and a second print frame whose aspect ratio is farthest from a square, when at least three types of print frames are set, and automatically calculates, based on the first print frame and second print frame, print frame data of a print size which is not displayed on the monitor screen.

7 Claims, 4 Drawing Sheets

U.S. PATENT DOCUMENTS

| | | |
|---|---|---|
| 5,316,396 A | 5/1994 | Fukaya |
| 6,795,209 B1 * | 9/2004 | Patton et al. ............... 358/1.18 |
| 2001/0042086 A1 | 11/2001 | Ueda et al. |
| 2004/0212837 A1 * | 10/2004 | Patton et al. ............... 358/1.18 |
| 2004/0239982 A1 * | 12/2004 | Gignac ...................... 358/1.15 |
| 2005/0005061 A1 * | 1/2005 | Robins ....................... 711/104 |

FOREIGN PATENT DOCUMENTS

| | | |
|---|---|---|
| DE | 692 30 082 T2 | 2/2000 |
| EP | 1 292 096 A2 | 3/2003 |
| EP | 1 383 305 A2 | 1/2004 |
| JP | 10-56558 | 2/1998 |
| JP | 2003-241935 A | 8/2003 |
| WO | WO 99/38087 | 7/1999 |

* cited by examiner

AUTOMATIC PRINT FRAME SETTING APPARATUS

This application is the U.S. National Phase under 35 U.S.C. §371 of International Application PCT/JP2004/010938, filed Jul. 30, 2004. The International Application was published under PCT Article 21(2) in a language other than English.

TECHNICAL FIELD

The present invention relates to an automatic print frame setting apparatus, comprising: image displaying means for displaying, on a monitor screen, image data used for producing photo prints; size setting means for setting one or more types of print sizes for the same image data; print frame displaying means for displaying, on the monitor screen, a print frame visually representing the set print size together with the image data; and print image data producing means for producing, based on the set print frame, print image data used for producing photo prints.

BACKGROUND ART

A print producing apparatus that reads image data stored in a recording medium of a digital camera to produce a photo print is known. When the recording medium is placed into such a print producing apparatus, read image data is displayed on a monitor screen. While looking at this monitor screen, the operator can set a print size, and an apparatus capable of setting three or more types of print sizes is known. When the print size is set, a print frame for visually representing the print size on the monitor screen is superposed on the image data for display. With the print frame superposed on the image data for display, the operator can confirm a range to be actually printed. Further, according to need, the operator can adjust the print range by changing the position of the print frame with respect to the image data or by some other means.

Here, a plurality of types, particularly three or more types, of print sizes may be set for the same image data. In displaying print frames, if all print frames corresponding to the set print sizes are displayed on the monitor screen, a problem may occur in that the monitor screen becomes complicated and difficult to see. Especially when three or more types of print sizes are set and all those print frames are simultaneously displayed, the screen configuration becomes extremely complicated. For this reason, conventionally, even when a plurality of print sizes are set, only a predetermined specific print frame is displayed. Thereby, the image configuration is prevented from becoming complicated.

However, with only the predetermined print frame displayed, when the print size of the predetermined print frame does not agree with a selected print size, a photo print which is not intended by the operator might be produced.

DISCLOSURE OF INVENTION

Problems to be Solved by the Invention

The present invention is made in view of the above-mentioned condition, and has an object to provide an automatic print frame setting apparatus capable of appropriately displaying and setting print frames even when three or more types of print sizes are set.

Means for Solving the Problems

For solving the above-mentioned problem, the automatic print frame setting apparatus according to the present invention comprises: image displaying means for displaying, on a monitor screen, image data used for producing photo prints; size setting means for setting one or more types of print sizes for the same image data; print frame displaying means for displaying, on the monitor screen, a print frame visually representing the set print size together with the image data; and print image data producing means for producing, based on the set print frame, print image data used for producing photo prints, wherein the print frame displaying means includes automatic print frame producing means that simultaneously displays, on the monitor screen, only two print frames, which are a first print frame whose aspect ratio is nearest to a square and a second print frame whose aspect ratio is farthest from a square, when at least three types of print frames are set, and automatically calculates, based on the first and second print frames, print frame data of a print size which is not displayed on the monitor screen.

The function and effect of the automatic print frame setting apparatus having the above-mentioned configuration are described. Image data for producing a photo print is displayed on the monitor screen, and one or a plurality of types of print sizes can be set for the same image data. When three or more types of print frames are set, while print sizes thereof could be visually represented on the monitor screen, only two print frames are displayed. Namely, only two print frames, which are a first print frame having a shape nearest to a square and a second print frame having a shape farthest from a square, are superposed on the image data for display. The first print frame has an aspect ratio of being 1 (square) or nearest to 1, while the second print frame farthest from a square has the largest aspect ratio. Since the remaining non-displayed print frame has a shape (or aspect ratio) between the first and second frames, the frame size and position of the non-displayed print frame can be estimated to some extent from the displayed first and second prints. Further, actual data of the non-displayed print frame can be automatically produced based on the data of the first and second print frames. As for the print frame other than the first and second print frames, therefore, the operator does not particularly perform adjustment operation (positional adjustment etc.) relative to the image data, so long as setting a print size. It is therefore possible to prevent the monitor screen from becoming complicated since only two frames are displayed even when three or more types of print sizes are set. Consequently, it is possible to provide an automatic print frame setting apparatus capable of appropriately displaying and setting print frames even when three or more types of sizes are set.

In the present invention, it is preferable that the automatically produced print frame certainly include an area common to the first and second print frames.

It is necessary to automatically produce a print frame of a non-displayed print size so as to reflect an intention of a client. Hence the automatic production is performed such that the set first and second print frames include an area (overlapping part) common to the first and second print frames. It is thereby possible to reflect a request from the client.

It is preferable that the automatically produced print frame be automatically produced based on positional information of the first and second print frames.

For example, it is possible to automatically produce a print frame so as to be disposed between the first and second print frames. This enables production of a photo print reflecting the intention of the client.

BEST MODE FOR CARRYING OUT THE INVENTION

Figure 1:
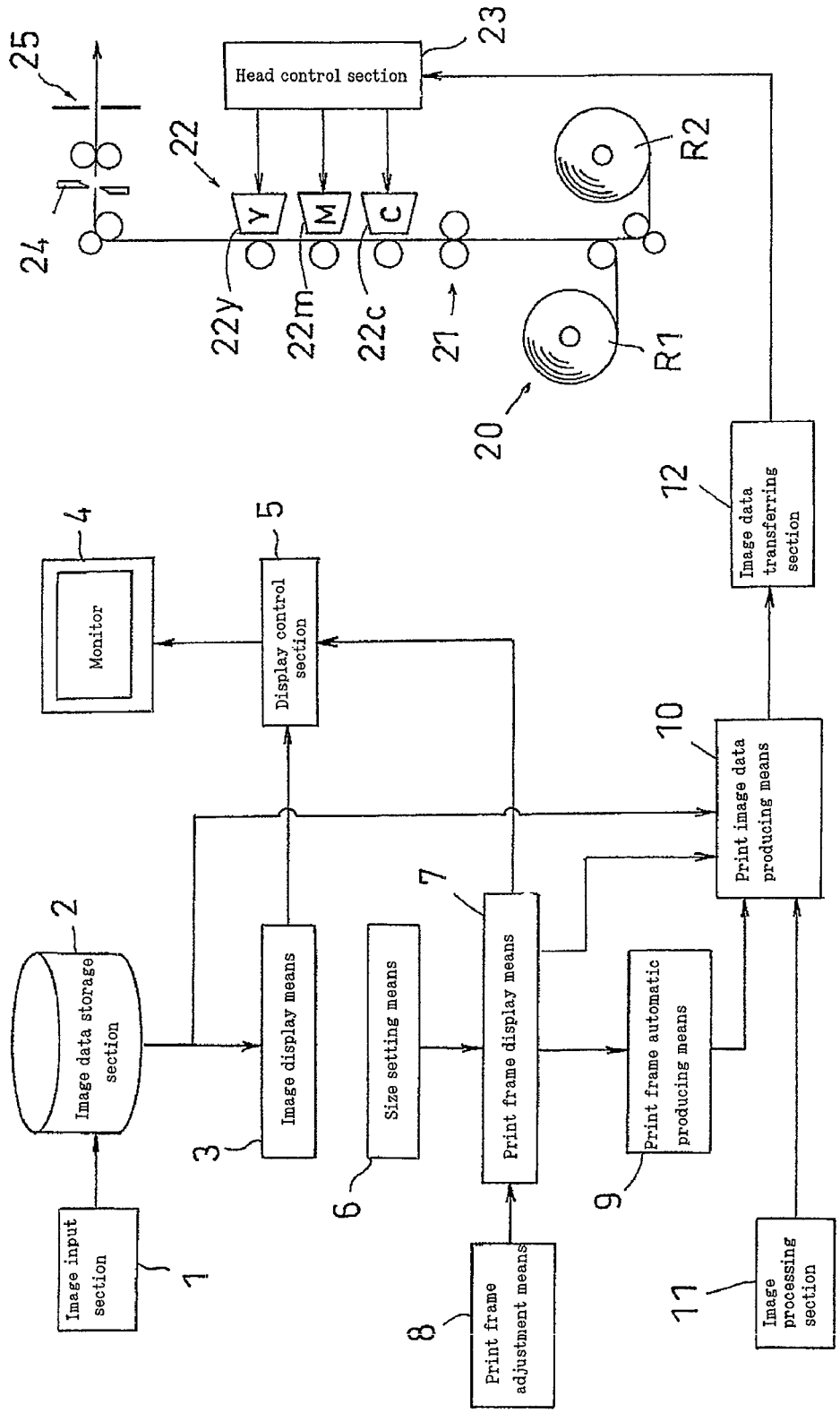
FIG. 1 is a pattern diagram showing a configuration of a print producing apparatus.

A preferred embodiment of a print producing apparatus provided with the automatic print frame setting apparatus according to the present invention is described using drawings. FIG. 1 is a pattern diagram showing a configuration of a print producing apparatus. This print producing apparatus is an apparatus that acquires image data to produce an image on paper by a thermal transfer system.

<Configuration of Print Producing Apparatus>

In FIG. 1, an image input section 1 has the function of acquiring image data from a recording medium for a digital camera. Further, the image input section 1 may be configured to be capable of acquiring image data from an appropriate recording medium (MO disc, CD-R, flexile disc etc.) other than the recording medium for a digital camera. An image data storage section 2 is a storage apparatus configured by a hard disc or the like, and stores image data acquired through the image input section 1. The image data is stored in order units. Here, one order refers to an image data group contained in one recording medium, and image data is managed in order units.

Image display means 3 has the function of displaying image data on a monitor 4. For example, the image display means 3 processes the image data into a size suitable for display on a monitor screen, and passes the data to a display control section 5. Naturally, the inputted image data may be displayed in its original size as it is. A size setting means 6 has the function of setting a print size when the image is to be outputted as a photo print. There are a variety of pint sizes, such as 3.5×5, 4×6, 5×7, and 8×10 (unit: inch), and a desired size can be set. Further, three or more types of print sizes can be set for the same image data.

A print frame display means 7 has the function of displaying a print frame of a print size set by the size setting means 6 together with the image data. The display data of the print frame is transmitted to the display control section 5 and superposed on the image data for display. It is thereby possible to recognize, on the screen, as to which area of the image data is cut out as a photo print. When one print size is set for certain image data, one print frame corresponding to that size is displayed on the screen. When two print sizes are set, two print frames corresponding to those two sizes are displayed. When three or more types of print sizes are set, print frames corresponding to all those print sizes are not displayed, but only two print frames are displayed, which are a print size having a shape nearest to a square (including a pure square) and a print frame having a shape farthest from a square. This regard is described later.

A print frame adjustment means 8 has the function of adjusting a position of the print frame relative to the image data. The positional adjustment can be performed while looking at the monitor screen. Further, the size of the print frame can also be changed. Provided, however, that the aspect ratio of the print frame is maintained, the size thereof can be changed. It is thereby possible to set and adjust a trimming range.

A print frame automatic producing means 9 has the function of automatically producing the print frame. It was previously described that, when three or more types of print sizes are set, only two print frames are displayed on the monitor screen. The remaining print frame is not displayed on the screen, and automatically produced based on data of the two print frames. The print image data producing means 10 has the function of producing image data for producing a photo print. Since a range for producing the photo print is determined when the image data and the print frame are determined, print image data can be produced using image data in the determined range. For example, the image data within the print frame is subjected to magnification processing so as to have a data size agreeing with the actual size of the photo print.

An image processing section 11 has the function of performing image processing, and this can also be operated while looking at the monitor screen. For example, it is determined whether or not a photo print can be produced with suitable color and color density by looking at an image displayed on the monitor screen, and correction data of the color and color density are inputted as needed. Further, correction such as red-eye correction, backlight correction or tone correction is performed as needed. A variety of correction data produced by this image processing section 11 is passed to the print image data producing means 10 and print image data, added with the correction data, is produced. The image data transferring section 12 transfers the produced print image data to a print head.

Next, a configuration of a printer section for producing a photo print is described. A paper magazine placement section 20 can be equipped with a plurality of paper magazines. In FIG. 1, two types of paper, a roll R1 and a roll R2, are installed. In this manner, two different types of paper with different paper widths and surface qualities can be installed. Naturally, the print section may be configured such that three or more types of paper can be installed.

Paper is pulled out either from the roll R1 or the roll R2 and conveyed along a prescribed conveyance channel. A conveyance system such as a conveyance roller 21 is provided along the conveyance channel. On a print head section 22, a head 22$y$ for producing a color Y (yellow), a color 22$m$ for producing a color M (magenta), and a head 22$c$ for producing a color C (cyan) are arranged in this order along the conveyance channel. Upon receipt of image data of each color transferred from the image data transferring section 12, a head control section 23 controls each of the heads 22$y$, 22$m$ and 22$c$ to produce a color image on the paper surface.

The paper on which the image has been produced is conveyed to the further downstream side, and cut into each piece by a paper cutter 24. The cut paper is ejected as a photo print from a paper eject section 25.

<Print Frame Setting Operation>

Figure 2:
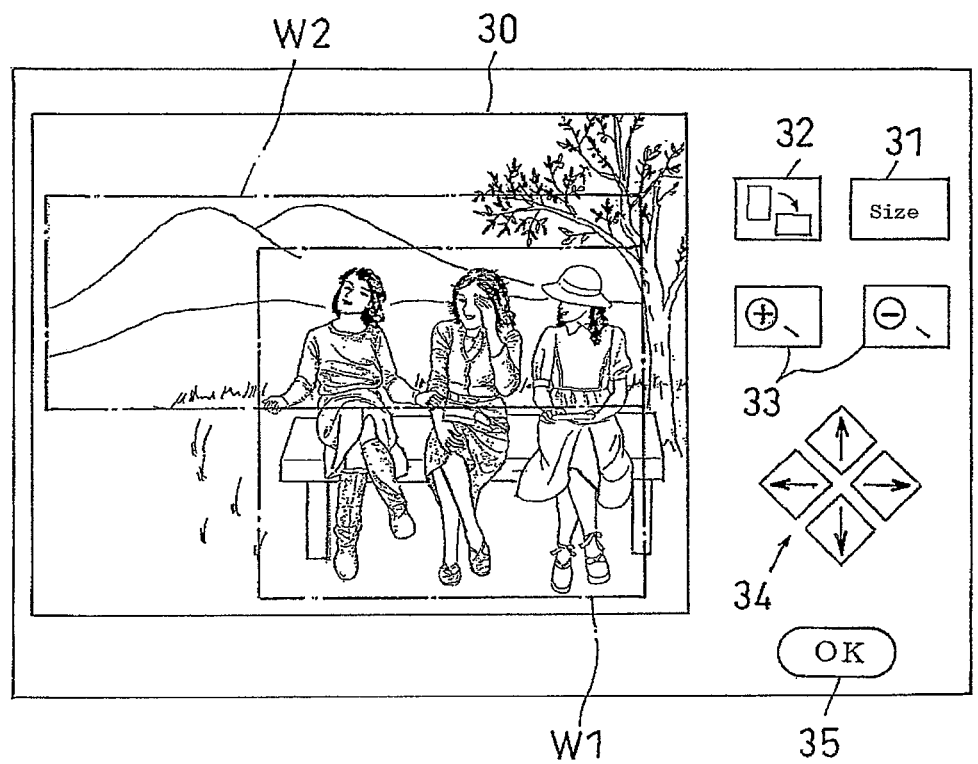
FIG. 2 is a view showing a display example of image data on a monitor screen.

Next, setting of a print frame is described. FIG. 2 is a view showing a state where one image data is displayed. Drawing number 30 denotes a full size of the image data. When a size setting button 31, which functions as a size setting means, is clicked, another screen (not shown) is started for setting a print size so that a print size of a photo print desired to be produced can be selected. An arbitrary number of print sizes can be set. Since the present invention relates to the case of setting three or more types of print sizes for the same image data, a description is predicated on that case. It is assumed that three types of print sizes are set. When the setting operation is completed, print frames are displayed on the screen by the function of the print frame display means 7. In this case, only two print frames corresponding to the set print size are displayed. Namely, a first print frame W1 having a shape nearest to a square and a second print frame W2 having a shape farthest from a square are displayed. The shape farthest from a square means the most slender rectangular shape.

A rotation button 32 is capable of rotating displayed image data by 90 degrees. For example, as for image data shot by a camera in a longitudinal position, the image can be converted into a right position by rotation by 90 degrees. A scaling button 33, which functions as a print frame adjustment means, is clicked to allow enlargement or reduction of the size of the displayed print frame. It should be noted that, when the size of the print frame is to be changed, the print frame is enlarged or reduced while the aspect ratio is maintained. It is to be noted that instead of enlarging or reducing the size of the print frame, a configuration may be adopted where the size of the displayed image data is enlarged or reduced. Using a positional adjustment cursor 34, which functions as a print frame adjustment means, the position of the print frame displayed on the screen in left/right and up/down directions can be adjusted. When an OK button 35 is clicked, the set contents are determined.

According to the configuration as thus described, even when three or more types of print sizes are set, the monitor screen does not become complicated since only two print frames are displayed on the screen. The relation between the displayed print frames and the image data can be visually confirmed on the monitor screen. Further, since a print frame which is not displayed on the monitor screen can be estimated from the first and second print frames W1 and W2 actually on display, no unexpected range is produced as a photo print. Namely, since an aspect ratio of a third print frame which is not displayed has an aspect ratio between the first and second print frames W1 and W2, it is possible to confirm a print range accurately to some degree even when the print frame is not displayed on the screen.

Figure 3:
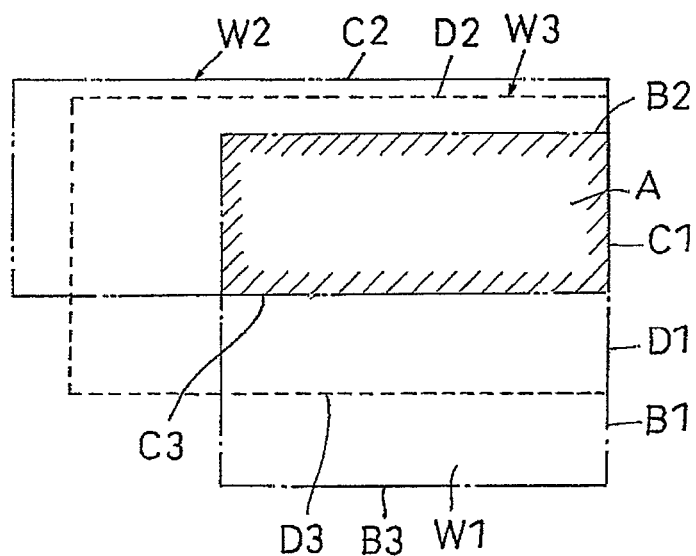
FIG. 3 is a view (No. 1) showing a range where a non-displayed print frame is automatically produced.

FIG. 3 is a view for explaining the third print frame W3 which is not displayed. When the first and second print frames W1 and W2 are set, based on this set data, the third print frame W3 (indicated by the broken line in FIG. 3) can be automatically produced. In this case, the third print frame W3 is produced so as to certainly include an area A which is included in both the first and second print frames W1 and W2. The area A included in both the first and second print frames W1 and W2 includes a main object of shooting and is considered as an important area.

Since the right sides B1 and C1 of the first and second print frames W1 and W2 agree with each other, the right side D1 of the third print frame W3 is also made to agree. Since the upper sides B2 and C2 and the lower sides B3 and C3 do not agree with each other, the third print frame W3 is automatically produced such that the upper side D2 and the lower side D3 of the third print frame W3 are positioned between the above-mentioned upper and lower sides. It is possible to decide, as appropriate, specific in-between positions where the upper and lower sides D2 and D3 are set. It is possible, for example, that the upper side D2 is set in a position just a half of the distance between the upper sides B2 and C2, and the lower side D3 is set between the lower sides B3 and C3.

Figure 4:
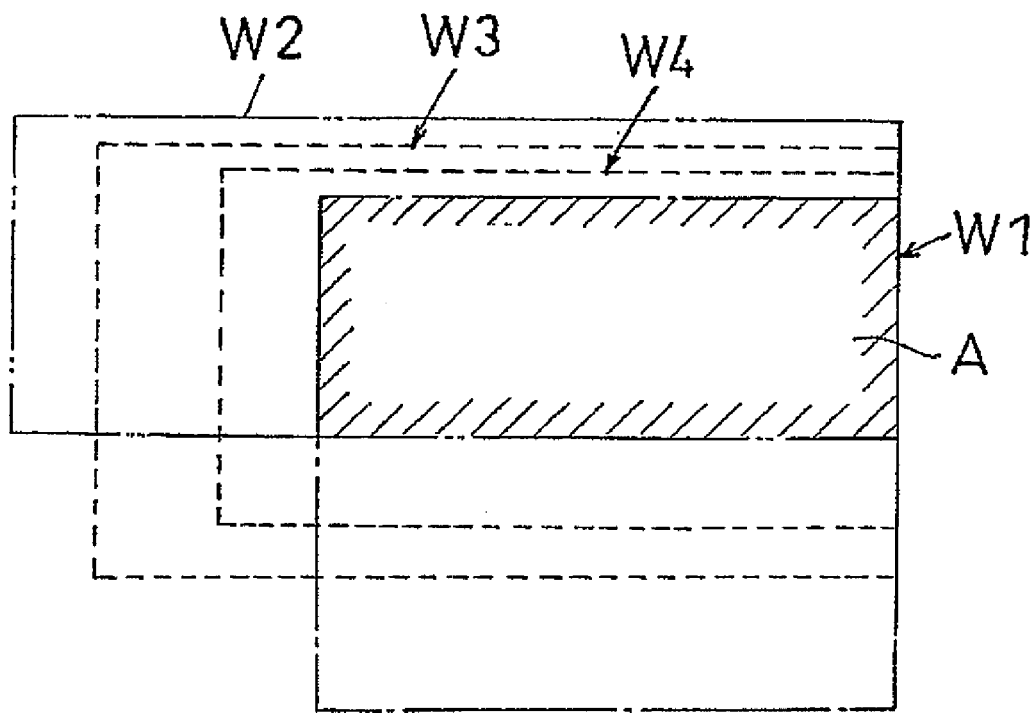
FIG. 4 is a view (No. 2) showing a range where a non-displayed print frame is automatically produced.

FIG. 4 shows an example of cases where four types of print sizes are set. It is only the first print frame W1 and the second print frame W2 that are displayed, and the third print frame W3 and a fourth print frame W4 are automatically produced. In this case, those frames are automatically produced so as to certainly include the common area A.

Figure 5:
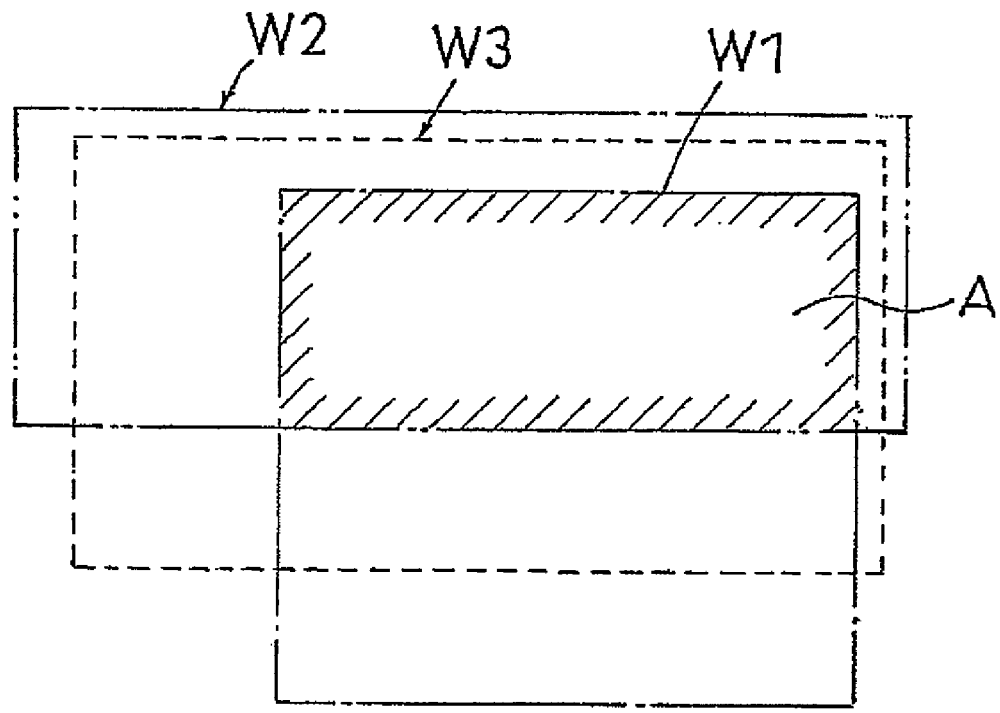
FIG. 5 is a view (No. 3) showing a range where a non-displayed print frame is automatically produced.

Different from FIG. 3, FIG. 5 is an example where the right sides of the first and second print frames W1 and W2 do not agree with each other. Also in this case, the third print frame W3 is automatically produced so as to include the common area A. Also in this case, the position of the sides can be set in the same manner as above.

<Procedure for Producing Photo Print>

Figure 6:
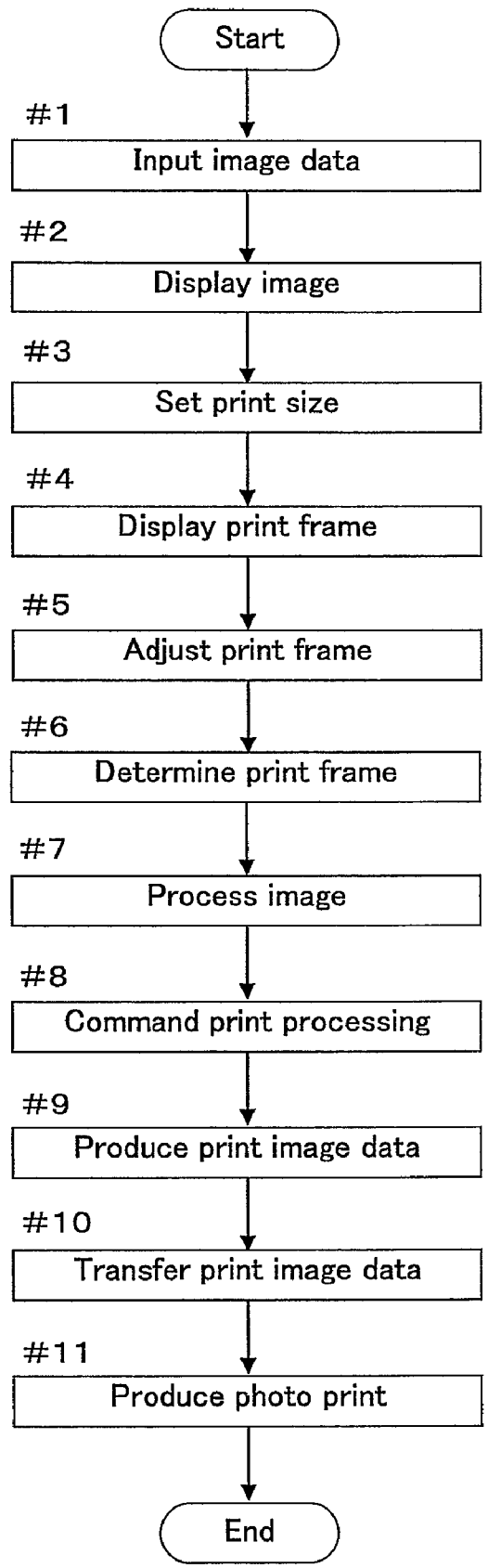
FIG. 6 is a flowchart showing a procedure in producing a photo print.

Next, a procedure for producing a photo print is described using a flowchart of FIG. 6. First, image data is acquired through the image input section 1 (#1). As shown in FIG. 2, the acquired image data is displayed on the monitor screen (#2). Next, a print size is set (#3). It is assumed that three types of print sizes are set (#3). When the setting is completed, a print frame is displayed (#4). Positional adjustment and size adjustment of the print frame are performed on the screen (#5). After completion of the adjustment, the position and size of the print frame are determined (#6). Thereby, a non-displayed print frame is automatically produced.

Next, the image data is subjected to image processing operation (#7). It should be noted that the image processing step may be performed at an earlier stage (before setting the print size). After completion of the image processing, a command to start print processing is made (#8). Based on the image data, the image processing data, and data of the set print frame, print image data is also produced (#9). Since three types of print sizes are set, three types of print image data are produced. The produced print image data is transmitted to the print head section 22 by the image data transferring section 12 (#10), to produce a photo print (#11).

In addition, when a print size with which printing on installed paper is not possible, a warning is given to replace a paper magazine and then perform print processing. A timing for giving this warning can be set as appropriate, and may be exemplified by a timing at which the print size is set, a timing at which the print image data is going to be produced, and a timing at which the print image data is going to be transmitted.

In addition, there are cases where, even when the print sizes are different, printing can be made on paper of the same size. For example, when print sizes are 3.5×7 inches and 5×7 inches, the direction in which an image is produced is changed to allow production of images on paper having the same width of seven inches In the flowchart shown in FIG. 6, when one order includes a large number of pieces of image data, it is configured such that, after setting image processing and print frames for all those pieces of image data, the print image data is transmitting to the print head.

Another Embodiment

While the example of acquiring image data from the digital recording medium was described in the present embodiment, the present invention is also applicable to the case of acquiring a coma-image from an already developed photo print by a film scanner. While the thermal-transfer printer was described in the present embodiment, the present invention is also applicable to the case of using another type of dry developing print processing apparatus such as an inkjet printer. Further, the present invention is also applicable to the case of using a print producing apparatus that performs development processing on a photo sensitive material by means of a developing solution to produce a photo print.

The image configuration shown in FIG. 2 shows one example, and a variety of modified examples are possible. The number of images displayed on the screen is not necessarily one, and a plurality of images may be simultaneously displayed.

The invention claimed is:

1. An automatic print frame setting apparatus, comprising:
   image displaying means for displaying, on a monitor screen, image data used for producing photo prints;
   size setting means for setting one or more types of print sizes for the same image data;
   print frame displaying means for displaying, on the monitor screen, a print frame visually representing the set print size together with the image data; and
   print image data producing means for producing, based on the set print frame, print image data used for producing photo prints,
   wherein said print frame displaying means includes automatic print frame producing means that
   simultaneously displays, on the monitor screen, only two print frames, which are a first print frame whose aspect ratio is nearest to a square and a second print frame whose aspect ratio is farthest from a square, when at least three types of print frames are set, and
   automatically calculates, based on said first print frame and second print frame, print frame data of a print size which is not displayed on the monitor screen.

2. The automatic print frame setting apparatus according to claim 1, wherein said automatically produced print frame certainly includes an area common to the first print frame and second print frame.

3. The automatic print frame setting apparatus according to claim 1, wherein said automatically produced print frame is automatically produced based on positional information of the first print frame and second print frame.

4. The automatic print frame setting apparatus according to claim 2, wherein said automatically produced print frame is automatically produced based on positional information of the first print frame and second print frame.

5. An automatic print frame setting apparatus, comprising:
   an image displaying unit for displaying, on a monitor screen, image data used for producing photo prints;
   a size setting unit capable of setting at least three types of print sizes for same image data;
   a print frame displaying unit for displaying, on the monitor screen, one or two print frames each visually representing the set print size together with the image data, said print frame displaying unit displaying simultaneously only two print frames on the monitor screen when the size setting unit sets three or more types of print sizes, said two print frames being a first print frame whose aspect ratio is nearest to a square and a second print frame whose aspect ratio is farthest from a square;
   an automatic print frame producing unit for automatically calculating, based on said first print frame and second print frame, print frame data of a print size which is not displayed on the monitor screen; and
   a print image data producing unit for producing, upon selection of a print frame from the print frames displayed and not displayed if any, print image data defined by the selected print frame used for producing photo prints.

6. The automatic print frame setting apparatus according to claim 5, wherein the automatic print frame producing unit is configured to automatically produce the non-displayed print frame(s) each including image data overlapping with image data defined by both the first print frame and the second print frame.

7. The automatic print frame setting apparatus according to claim 5, wherein the automatic print frame producing unit is configured to produce the non-displayed print frame(s) based on positional information of the first print frame and second print frame on the monitor screen.

* * * * *